(12) United States Patent  (10) Patent No.: US 7,774,268 B2
Bradley  (45) Date of Patent: Aug. 10, 2010

(54) SYSTEM, METHOD, AND APPARATUS FOR IDENTIFYING AND AUTHENTICATING THE PRESENCE OF HIGH VALUE ASSETS AT REMOTE LOCATIONS

(75) Inventor: A. (Tony) W. Bradley, De Moines, IA (US)

(73) Assignee: The TB Group, Inc., Des Moines, IA (US)

( * ) Notice: Subject to any disclaimer, the term of this patent is extended or adjusted under 35 U.S.C. 154(b) by 1330 days.

(21) Appl. No.: 10/791,518

(22) Filed: Mar. 1, 2004

(65) Prior Publication Data

US 2004/0177032 A1   Sep. 9, 2004

Related U.S. Application Data

(60) Provisional application No. 60/451,328, filed on Mar. 3, 2003, provisional application No. 60/482,554, filed on Jun. 19, 2003.

(51) Int. Cl.
G06Q 40/00  (2006.01)

(52) U.S. Cl. .............................. 705/38; 705/28; 705/35; 705/317; 700/236

(58) Field of Classification Search .................. 340/5.1; 705/35, 38
See application file for complete search history.

(56) References Cited

U.S. PATENT DOCUMENTS

| | | | |
|---|---|---|---|
| 4,636,950 A | 1/1987 | Caswell et al. | |
| 5,323,315 A * | 6/1994 | Highbloom | ................... 705/38 |
| 5,452,930 A | 9/1995 | Morgan | |
| 5,563,579 A * | 10/1996 | Carter | ................... 340/539.17 |
| 5,664,113 A | 9/1997 | Worger et al. | |
| 5,708,417 A * | 1/1998 | Tallman et al. | ......... 340/539.23 |
| 5,774,876 A | 6/1998 | Woolley et al. | |
| 5,949,335 A | 9/1999 | Maynard | |
| 6,025,774 A * | 2/2000 | Forbes | ................... 340/426.19 |
| 6,078,251 A | 6/2000 | Landt et al. | |
| 6,148,291 A | 11/2000 | Radican | |
| 6,356,802 B1 | 3/2002 | Takehara et al. | |
| 6,388,579 B1 | 5/2002 | Adcox et al. | |
| 6,427,913 B1 | 8/2002 | Maloney | |

(Continued)

FOREIGN PATENT DOCUMENTS

EP   1 085 438 A2   3/2001

(Continued)

OTHER PUBLICATIONS

Carmichael, Richard S. "Floorplanning: Industry in Transition," The Secured Lender, (Nov./Dec. 1992), vol. 48, Iss. 6, p. 52.*

(Continued)

*Primary Examiner*—Kambiz Abdi
*Assistant Examiner*—Elizabeth H Rosen
(74) *Attorney, Agent, or Firm*—McKees, Voorhees & Sease, P.L.C.

(57) ABSTRACT

A system, method, and apparatus for identifying and authenticating the presence of high value assets at remote location includes associating an identification tag with the asset. The identification tag includes identification information that can be electronically read and sent to a remote location for verifying the authenticity of the asset.

9 Claims, 7 Drawing Sheets

U.S. PATENT DOCUMENTS

| | | |
|---|---|---|
| 6,442,276 B1 | 8/2002 | Doljack |
| 6,471,878 B1 | 10/2002 | Greene et al. |
| 6,502,005 B1 | 12/2002 | Wrubel et al. |
| 6,512,478 B1 | 1/2003 | Chien |
| 6,547,137 B1 | 4/2003 | Begelfer et al. |
| 6,550,674 B1 | 4/2003 | Neumark |
| 6,560,579 B2 | 5/2003 | Soga et al. |
| 6,606,556 B2 | 8/2003 | Curatolo et al. |
| 6,674,368 B2 | 1/2004 | Hawkins et al. |
| 2001/0053949 A1 | 12/2001 | Howes et al. |
| 2002/0004752 A1 | 1/2002 | Kuma |
| 2002/0005774 A1* | 1/2002 | Rudolph et al. ............ 340/5.61 |
| 2002/0030596 A1 | 3/2002 | Finn et al. |
| 2002/0040927 A1 | 4/2002 | Davis et al. |
| 2002/0073000 A1 | 6/2002 | Sage |
| 2002/0080032 A1 | 6/2002 | Smith et al. |
| 2002/0107777 A1 | 8/2002 | Lane et al. |
| 2002/0111819 A1 | 8/2002 | Li et al. |
| 2002/0135479 A1 | 9/2002 | Belcher et al. |
| 2002/0147650 A1 | 10/2002 | Kaufman et al. |
| 2003/0014332 A1 | 1/2003 | Gramling |
| 2003/0031819 A1* | 2/2003 | Adams et al. .............. 428/40.1 |
| 2003/0085276 A1 | 5/2003 | Ogihara et al. |
| 2003/0117268 A1 | 6/2003 | Hewitt et al. |
| 2003/0120745 A1* | 6/2003 | Katagishi et al. ............ 709/217 |
| 2003/0132854 A1 | 7/2003 | Swan et al. |
| 2003/0137968 A1 | 7/2003 | Lareau et al. |
| 2003/0154141 A1* | 8/2003 | Capazario et al. ............. 705/27 |
| 2003/0177095 A1 | 9/2003 | Zorab et al. |
| 2003/0209601 A1 | 11/2003 | Chung |
| 2004/0024660 A1 | 2/2004 | Ganesh et al. |
| 2004/0041707 A1* | 3/2004 | Hull et al. ................ 340/568.1 |
| 2004/0044596 A1 | 3/2004 | Franks |
| 2004/0088228 A1* | 5/2004 | Mercer et al. ................ 705/28 |

FOREIGN PATENT DOCUMENTS

| | | |
|---|---|---|
| WO | WO 01/67341 A | 9/2001 |

OTHER PUBLICATIONS

"AOW to Track Goods in Transit: Introduces Smart Card Services," Businessline, (Nov. 8, 2002), p. 1.*

"S&P Assign DaimlerChrysler Master Owner Trust 2002-A Preliminary Rating," PR Newswire, (Jun. 10, 2002), p. 1.*

Frontline Solutions article "And the show stoppers were: The products, the agreements, and an acquisition or two." Dec. 2001.

Automatic ID News "Asset tracking benefits large organizations" Oct. 1997.

Business Wire "Intermec to Incorporate MIKOH RFID Transponders into Array of Data Collection Labels; Intermec First to Obtain Smart &Secure Certification." Dec. 6, 2000.

Frontline Solutions "Mobile asset management paves way for new ERP system" Jan. 2000.

PR Newswire "SAMSys Technologies Inc. Delivers Proprietary RFID Reader to MIKOH Corporation." Aug. 17, 2000.

PR Newswire "Texas Instruments Announces Availability of Tag—it(TM) Smart Label Inlay to Support New ISO 15693 International Standard." Nov. 14, 2001.

Knaster, Barry "Fixed assets: Picking the Right Tool: Spreadsheets just don't cut it in tracking fixed assets and depreciation." (Software Review) Nov. 2001.

Business Wire Sure Trace Confirms Channel Partner Asset Protection 'Pilot Program' with Budget Rent a Car—S. Africa—to Combat Rampant Theft in Rental Car Industry. Apr. 29, 2003.

PCT/US2004/006387 Notification of Transmittal of the International Search Report and Written Opinion of the International Searching Authority (counterpart foreign application).

* cited by examiner

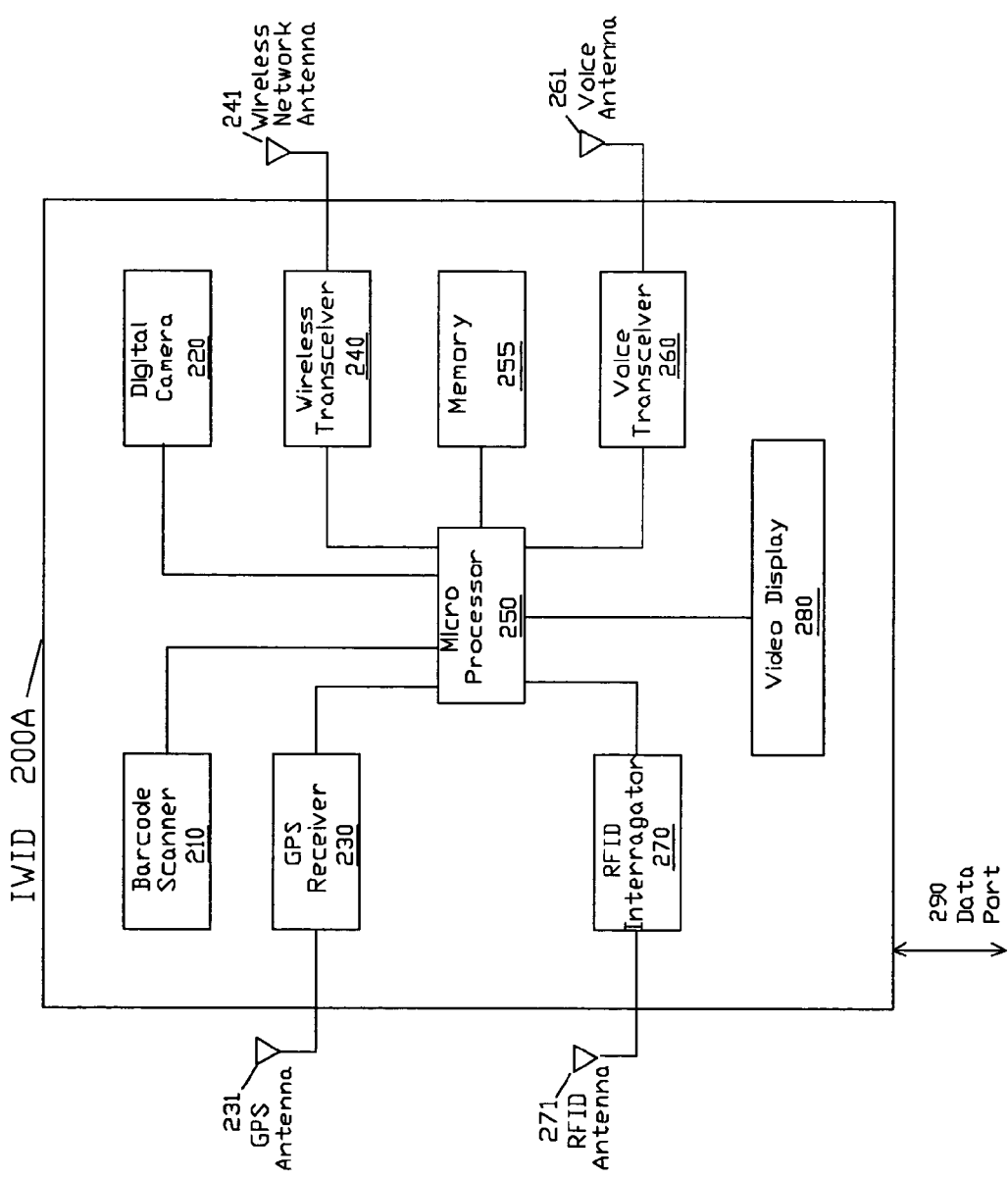

SYSTEM, METHOD, AND APPARATUS FOR IDENTIFYING AND AUTHENTICATING THE PRESENCE OF HIGH VALUE ASSETS AT REMOTE LOCATIONS

CROSS-REFERENCE TO RELATED APPLICATIONS

This application is a conversion of, and claims priority to U.S. Provisional Application Ser. No. 60/451,328, filed Mar. 3, 2003, and hereby incorporated by reference in its entirety, and U.S. Provisional Application Ser. No. 60/482,554, filed Jun. 19, 2003, also hereby incorporated by reference in its entirety.

FIELD OF THE INVENTION

The present invention relates generally to a system, method and apparatus for auditing and anti-fraud purposes, used for authenticating the identity, possession, genuine presence, and/or location of a high value asset, which may be encumbered, financed, "floor planned", rented, leased, etc. A high value asset may be an item such as, but not limited to a car, truck, recreational vehicle, boat, motorcycle, construction equipment, farm equipment, manufacturing equipment, containerized freight, art, antiques, collectables, etc. In addition, the database disclosed in the present invention can also be used for recording, storing, and retrieval of information related to a specific high value asset for activities other than authentication and audit. These may be activities such as, but not limited to inventory control, repair work orders, wholesale auto auctions, police and government auto auctions, insurance and salvage auto auctions which process and sell salvage vehicles principally to licensed dismantlers, rebuilders and used vehicle dealers, targeted advertising, title history, customer loyalty programs, Customer Relationship Management (CRM), sales force automation, distribution control, logistics management, document control, voice and/or text communications, etc.

PROBLEMS IN THE ART

Today, high value assets, particularly vehicles, machinery, equipment, or other dealer inventory which may be encumbered, financed, "floor planned", rented, leased, etc., are difficult to track, authenticate, and audit. This is due to the fact they are widely geographically dispersed, mobile, can be easily converted to cash without possession of a title, can not be easily traced, and most generally it is inferred that possession is ownership, so it is difficult to determine who actually owns the high value asset. In most cases, in order for a high value asset, such as a car or truck to be properly audited, their identity must somehow be verified by conducting some type of physical inspection. This is usually accomplished by someone traveling to a remote location to perform the on-site inspection.

As an example, most auto auctions have introduced "floor plan" arrangements for qualified dealers where dealers are issued a "credit line" similar to a credit card, for use to buy vehicles sold through the auction. The auction charges the dealer's purchases against his credit line so he doesn't have to actually pay for a particular vehicle until it is either sold or "aged" 60-90 days, whichever occurs first. In the meantime, the auction retains the title, but the dealer is allowed to display the vehicle for sale at their dealership locations. Most "floor plan" arrangements generally work the same way. When a dealer sells a "floor planned", or financed vehicle, the dealer is supposed to pay off the finance company immediately. Once the vehicle is paid off, the title is released from the finance company to the dealer so the vehicle can be properly titled into the customer's name that purchased the vehicle. Usually with floored vehicles, the dealer receives payment from the customer at the time of sale and tells the customer the title will be provided later. The customer then drives off with a car that is still financed by the dealer through the auction or other finance company. Consequently, the customer now possesses the collateral ("floored car"), the dealer has the cash, but the auction or finance company holds a title to the vehicle that is now in the possession of a third-party, and is no longer located at the dealership. This situation puts both the finance company and the buyer in a very precarious position until the dealer decides to pay the auction or finance company for the vehicle. Thus, it is important for several reasons that the dealer immediately pay the finance company and transfers the title to the new owner to avoid many potential problems for all concerned parties.

In a perfect world this wouldn't be an issue, but if a dealer is experiencing cash flow problems, this presents an opportunity for the funds to be retained and utilized by the dealer for a period of time, taking the place of a short-term loan. The dealer deposits the funds from the transaction into his bank account with good intentions to payoff the finance company when his cash position improves. However, if the dealer's cash flow doesn't improve, he can quickly get into a position where he is financially unable to pay off the finance company, or as it is known he is now seriously "out of trust". This type of situation can quickly escalate into a large sum of money that is owed, as well as being a large liability exposure for the finance company. If the dealer should then become insolvent, there are many issues concerning who has the legal right to the collateral. This is because the auction usually doesn't file individual liens against individual "floor planned" vehicles, so typically liens are usually not recorded, thus the auction may have both the associated liability along with the financial risk of losing their collateral.

These "floor plan" arrangements have become so popular that auction organizations have signed up thousands of dealers, and many dealers use "floor planning" for a majority of their inventory. This method of doing business has become a very popular way for dealers to finance their inventory because banks are reluctant to provide competitive "floor plan" financing, especially to used car dealers. This method is also very convenient and usually has less paperwork involved, so it is very attractive to used vehicle dealers. These financing programs have been so successful, that auction organizations not offering these programs are losing many dealers to auction groups that do provide these "floor planning" arrangements. Recently, in order to avoid the problem described above where dealers convert funds for short-term usage, many auction groups have started to perform random audits of their financed dealers. These auditing functions have developed many problems, and consequently third-party audit firms, such as DataScan Technologies, are often utilized to conduct audits. These on-site audits are rapidly becoming a very expensive proposition due to the inefficiencies associated with traveling to remote, dispersed locations to physically locate, verify, and audit the presence of each "floor planned" vehicle at the various dealer locations.

The risks usually associated with 'floor planning' in many industries can generally be summarized as follows:

1. "Floor planned" items are typically very widely dispersed and therefore difficult to monitor and audit.
2. When a dealer sells an encumbered or "floor planned" item, there is not an adequate mechanism in place to alert the finance company that their collateral has been sold.
3. Collateral that is sold, but not immediately paid off and re-titled, expose the finance company to great financial and liability risks.
4. The finance company is very dependant upon the dealer paying for an item immediately after the sale in order to reduce these financial and liability risks.
5. Auctions and finance companies have discovered that if not closely monitored, many dealers will use a customer's money as long as they can, which greatly increases their financial risks.
6. Third party physical audits currently being performed are very costly for auctions and finance companies.

There is therefore a need for a more efficient method of authenticating the genuine presence, and therefore the identity and possession of a specific high value asset, and maintaining a database related to that specific high value asset for the recording, storing, and retrieval of information related to the audit, and other functions such as, but not limited to, inventory control, repair work orders, auto auctions, targeted advertising, title history, customer loyalty programs, Customer Relationship Management (CRM), sales force automation, distribution control, logistics management, document control, voice and/or text communications, etc.

FEATURES OF THE INVENTION

A general feature of the present invention is the provision of a system for authenticating the genuine presence of a high value asset and therefore its identity, possession, and/or location can be remotely verified which overcomes many of the problems found in the prior art.

A further feature of the present invention is the provision of a method for authenticating the genuine presence of a high value asset using bar code tags and/or integrated radio frequency identification technology.

A further feature of the present invention is the provision of a method for authenticating the genuine presence of a high value asset utilizing an encryption algorithm which uses information radiating from a radio frequency identification tag and a variable alpha, numeric, or alpha numeric audit code.

A further feature of the present invention is the provision of a method for location of a high value asset using radio frequency identification technology.

A further feature of the present invention is the provision of a method for location of a high value asset using global positioning system technology.

A further feature of the present invention is the provision of a method for location of a high value asset using cellular phone technology.

A further feature of the present invention is the provision of a method for location of a high value asset using Bluetooth technology.

A further feature of the present invention is the provision of a method for location of a high value asset using wireless local area network (WLAN) technology.

A further feature of the present invention is the provision of a method for location of a high value asset using ultra wideband (UWB) technology.

A further feature of the present invention is the provision of a method for authenticating the genuine presence of a high value asset using bar codes that cannot be copied, such as on photocopiers.

A further feature of the present invention is the provision of a method for authenticating the genuine presence of a high value asset using invisible bar codes that can only be read by a specific wavelength of light.

A further feature of the present invention is the provision of a method for authentication of a high value asset using invisible bar codes with integrated radio frequency identification technology.

A further feature of the present invention is the provision of a method for authentication of a high value asset using invisible bar codes with integrated UWB technology.

A further feature of the present invention is the provision of a method for location of a high value asset using invisible bar codes with integrated global positioning system technology.

A further feature of the present invention is the provision of a method for location of a high value asset using invisible bar codes with integrated cellular phone technology.

A further feature of the present invention is the provision of a method for location of a high value asset using invisible bar codes with integrated Bluetooth technology.

A further feature of the present invention is the provision of a method for location of a high value asset using invisible bar codes with integrated WLAN technology.

A further feature of the present invention is the provision of a method for authenticating the genuine presence of a high value asset using bumpy bar codes.

A further feature of the present invention is the provision of a method for authenticating the genuine presence of a high value asset using bumpy bar codes with integrated radio frequency identification technology.

A further feature of the present invention is the provision of a method for location of a high value asset using bumpy bar codes with integrated radio frequency identification technology.

A further feature of the present invention is the provision of a method for location of a high value asset using bumpy bar codes with integrated UWB technology.

A further feature of the present invention is the provision of a method for location of a high value asset using bumpy bar codes with integrated global positioning system technology.

A further feature of the present invention is the provision of a method for location of a high value asset using bumpy bar codes with integrated cellular phone technology.

A further feature of the present invention is the provision of a method for location of a high value asset using bumpy bar codes with integrated Bluetooth technology.

A further feature of the present invention is the provision of a method for location of a high value asset using bumpy bar codes with integrated WLAN technology.

A further feature of the present invention is the provision of a method for location of a high value asset using bumpy bar codes with integrated UWB technology.

A further feature of the present invention is the provision of a method for authenticating the genuine presence of a high value asset using digital watermarks.

A further feature of the present invention is the provision of a method for authenticating the genuine presence of a high value asset using digital watermarks and radio frequency identification technology.

A further feature of the present invention is the provision of a method for authenticating the genuine presence of a high value asset using digital watermarks and UWB technology.

A further feature of the present invention is the provision of a method for location of a high value asset using digital watermarks and radio frequency identification technology.

A further feature of the present invention is the provision of a method for location of a high value asset using digital watermarks and global positioning system technology.

A further feature of the present invention is the provision of a method for location of a high value asset using digital watermarks and cellular phone technology.

A further feature of the present invention is the provision of a method for location of a high value asset using digital watermarks and Bluetooth technology.

A further feature of the present invention is the provision of a method for location of a high value asset using digital watermarks and WLAN technology.

A further feature of the present invention is the provision of a method for authenticating the genuine presence of a high value asset using bar codes that morph into a different bar code using inks that can't be copied.

A further feature of the present invention is the provision of a method for authenticating the genuine presence of a high value asset using bar codes that morph into a different bar code using inks that cannot be copied with integrated radio frequency identification technology.

A further feature of the present invention is the provision of a method for authenticating the genuine presence of a high value asset using bar codes that morph into a different bar code using inks that cannot be copied with integrated UWB.

A further feature of the present invention is the provision of a method for authenticating the genuine presence of a high value asset using bar code labels that self-destruct which keeps them from being copied.

A further feature of the present invention is the provision of a method for authenticating the genuine presence of a high value asset using a radio frequency positioning system.

A further feature of the present invention is the provision of a method for authenticating the genuine presence of a high value asset using a UWB system.

A further feature of the present invention is the provision of a database related to a specific high value asset.

A further feature of the present invention is the provision of a user system interface to control access and usage of the system's database.

A further feature of the present invention is the provision of a method for users to access the database using a personal identification number (PIN).

A further feature of the present invention is the provision of an apparatus for users to authenticating the genuine presence a high value asset and recording, storing, and retrieval of data associated with a specific high value asset.

A further feature of the present invention is the provision of a method for using the present invention's database and apparatus for a retail sales activity.

A further feature of the present invention is the provision of a method for using the present invention's database and apparatus for an inventory control activity.

A further feature of the present invention is the provision of a method for using the present invention's database and apparatus for a repair work order activity or maintenance records.

A further feature of the present invention is the provision of a method for using the present invention's database and apparatus for an auction.

A further feature of the present invention is the provision of a method for using the present invention's database and apparatus for targeted advertising.

A further feature of the present invention is the provision of a method for using the present invention's database and apparatus for title history.

A further feature of the present invention is the provision of a method for using the present invention's database and apparatus for Customer Relationship Management (CRM).

A further feature of the present invention is the provision of a method for using the present invention's database and apparatus for sales force automation.

A further feature of the present invention is the provision of a method for using the present invention's database and apparatus for logistics management.

A further feature of the present invention is the provision of a method for using the present invention's database and apparatus for targeted advertising.

A further feature of the present invention is the provision of a method for using present invention's database and apparatus for document control.

A further feature of the present invention is the provision of a method for using present invention's database and apparatus for voice communications.

A further feature of the present invention is the provision of a method for using present invention's database and apparatus for text-based communications.

A further feature of the present invention is the provision of a method for users to access the database using a password.

A further feature of the present invention is the provision of a method for users to access the database using a biometric identification.

One or more of these and/or other features and advantages of the present invention will become apparent from the following specification and claims.

SUMMARY OF THE INVENTION

The present invention relates generally to a system, method and apparatus for authenticating the genuine identity, actual possession, care, custody and control, and/or location of a high value asset, which may be encumbered, financed, "floor planned", rented, leased, etc., for auditing and anti-fraud purposes.

The identification and authentication of a high value asset creates a very strong assurance that an audited item is fraud and error free. Identification is the process that assures the high value asset being audited exists within the parameters described within the present invention. Authentication is the process that assures the high value asset being audited is the actual asset and not a counterfeit, fraud, or duplicate. The level of assurance provided by the present invention is very reliable as a result of multiple levels of authentication that can be provided through the use of the tag described herein.

A high value asset may be an item such as, but not limited to a car, truck, recreational vehicle, boat, motorcycle, construction equipment, farm equipment, manufacturing equipment, containerized freight, art, antiques, collectibles, etc. In addition, the database disclosed in the present invention can be used for recording, storing, and retrieval of information related to a specific high value asset for activities other than authentication and audit. These may be activities associated with dealerships, sales outlets, stores and auction locations such as, but not limited to inventory control, repair work orders, auto auctions, government auto auctions, salvage auto auctions which process and sell salvage vehicles principally to licensed dismantlers, rebuilders and used vehicle dealers, targeted advertising, title history, customer loyalty programs, Customer Relationship Management (CRM), sales force automation, field force automation, distribution control, logistics management, document control, voice and/or text communications, etc.

Also, rental, leasing, finance, insurance, service companies, automobile auctions, law enforcement agencies and state DOT's may benefit from applications that query, store, modify, and retrieve information contained in the present invention's database.

The preferred embodiment of the present invention is comprised of three basic components, including an Integrated Wireless Interface Device (IWID), a means of identifying a high value asset, and a back-end database. This is an integrated solution for the automobile auction and sales industries that provides self-audit functionality and centralized database services. It is to be understood that the invention is not to be limited to this preferred embodiment.

The primary purpose of the present invention is to remotely authenticate the genuine presence of a high value asset, particularly an asset that is "floor planned", financed, and relocated to a remote location where it is offered for sale. As an example, the present invention can be used to audit an auto dealer's financed inventory in order to prevent the dealer from using a customer's payment from the purchase of a financed vehicle as a short-term loan, instead of the dealer paying it off immediately, as he should. Authentication of the genuine presence of a vehicle is accomplished through the use of a unique identification tag that may include a bar code and/or radio frequency identification (RFID) chip, and may include a secondary means of authentication. The authentication audit is performed using a bar code reader and/or RFID interrogator integrated into a specialized piece of equipment (IWID), or using existing stand-alone equipment such as a PDA connected to a bar code and/or RFID combination device. The equipment used for the authentication audit can also function as a platform for communication at an auto auction, or other activities at a dealership including, sales, repair work orders, inventory control, etc. The back-end database relates a bar code and/or identifier contained in an RFID chip, which is contained on an identification tag that can't be removed without being destroyed or disabled from a vehicle, to the vehicle identification number (VIN). The back-end database can also be used as a clearinghouse for a particular party in the sales chain which currently has care, control, and custody of a particular vehicle. In addition, the back-end database can be used to provide pertinent vehicle information to different automobile auctions, even those within the same company, which usually treat each vehicle as a new database record when it enters their premises for an auction. This information would be especially useful to state DOT's and insurance companies who are collecting fees or underwriting insurance on a vehicle that may have changed ownership and have not yet been paid for by a dealer to the company that has financed the vehicle. The term "financier" is used broadly herein to define one who provides some type of financing or otherwise has a financial interest directly or indirectly in an asset. The term "financee" is used broadly herein to define one who receives some type of financing or other financial benefit based on or associated with the asset.

In the preferred embodiment, the IWID is based on a personal digital assistant (PDA) form factor. According to the specific type of means used to authenticate the presence of a high value asset, the IWID will have the appropriate capability to scan a printed bar code, and/or a video bar code, and/or a bumpy bar code, and/or an invisible bar code, a morphing bar code, and/or a digital watermark. These technologies may be further integrated with radio frequency identification (RFID), intelligent label or tag, and/or GPS, and/or cellular phone based technology, or any other wireless radio frequency location technology, to provide a secondary level of authentication to validate the genuine presence of a specific high value asset. An IWID with GPS technology can also be used to record the location of a high value asset. The IWID is also preferably capable of wireless and/or wired voice and/or text-based communications over a local and/or global telecommunications network.

Alternatively, the IWID's form factor may include mobile computing devices such as, but not limited to, a tablet, laptop, cell phone, etc of course. The present invention contemplates that the IWID can be of various form factors. Those specifically described herein are merely preferred.

The tag used as a means for authenticating the genuine presence of a high value asset may include any one, or all, or combination of the following features: a one-dimension or two-dimension bar code, a bumpy bar code, an invisible bar code that can only be read using a specific wavelength of light as a primary or secondary means of authentication. A bar code on the tag may also be printed using ink that cannot be copied, and/or printed on a self-destructing material to prevent fraudulent copying of the bar code. To prevent fraudulent identification of a high value asset the tag may include an embedded RFID chip as a primary or secondary means of authenticating the true presence of the actual asset. In addition, the tag may include a digital watermark as an additional level of authentication. The presence of a high value asset may be determined by using GPS or RFID to determine the position of a tag and/or IWID by means of radio frequency positioning. Alternatively, the tag may be affixed by a means of a strap, similar to a wrist band that is a part of an electrical circuit used to power the passive electronics in the tag, which would be particularly useful to secure containerized freight.

The final component in the present invention is a database that can be used for recording, storing, and retrieval of information related to a specific high value asset for the purposes of authentication and/or audit. The database, which may be public or private, may be used for other related activities such as, but not limited to inventory control, repair work orders, auto auctions, government auto auctions, salvage auto auctions which process and sell salvage vehicles principally to licensed dismantlers, rebuilders and used vehicle dealers, targeted advertising, title history, customer loyalty programs, Customer Relationship Management (CRM), sales force automation, distribution control, field force automation, logistics management, document control, voice and/or text communications, etc. The item specific information may reside in the IWID device itself, and/or in a remote database.

The advantages of the present invention include:
1. Reduced cost of conducting audits relating to assets that have been produced, sold "floor planned", or financed, and then relocated to a remote location.
2. Reduced exposure to risk for auction, finance and insurance companies, dealers, state DOT's, and customers.
3. Auctions, state DOT's and finance companies will collect their money in a timelier manner.
4. Provides a secure method of vehicle verification/authentication to discourage fraud by dealers, lease and rental companies.
5. Titles will be properly transferred sooner which reduces the liability for all parties.
6. "Out of Trust" situations will not have the opportunity to escalate as easily.
7. Dealer awareness of a 'tighter' control system will lead to lower costs, less loss, and less liability, for auction and finance company.

8. Provide a more efficient fee collecting system for state DOT's.

According to one aspect of the invention, a method for remotely authenticating an asset is disclosed. The method provides for associating a unique identification tag with the asset, reading identification information from the unique identification tag at a first location, sending the identifying information from the first location to a remote location, and verifying authenticity of the asset at the remote location based on the identifying information.

According to another aspect of the invention a first party can verify compliance by a second party with terms of an agreement related to an asset. The method includes associating a unique identification tag with the asset. The method further requires the second party to provide for reading identifying information from the unique identification tag and sending the identifying information to the first party. The method then verifies that the asset is authentic at least partially based on the identifying information.

BRIEF DESCRIPTION OF THE DRAWINGS

FIG. 2A is a block diagram of an integrated wireless interface device (IWID) contained in a single device.

PREFERRED EMBODIMENTS

Figure 1:
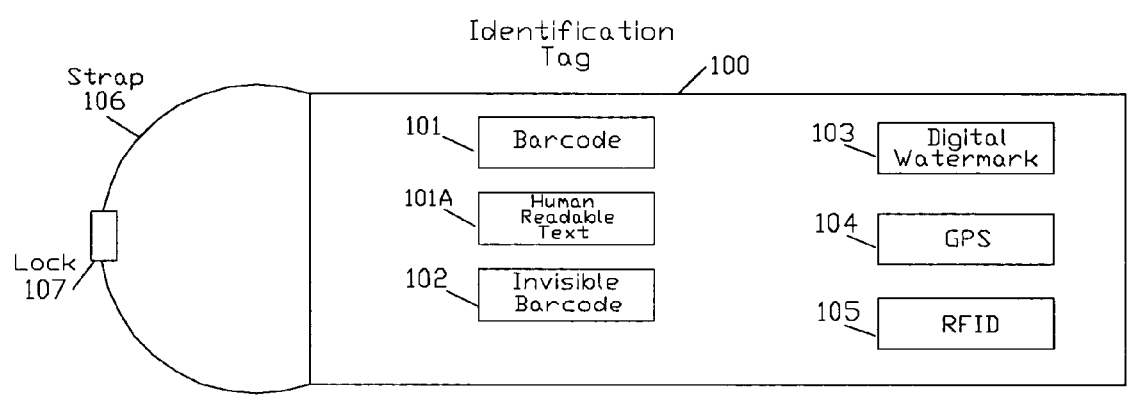
FIG. 1 is an illustration of a tag.

FIG. 1 illustrates a tag that is part of the integrated solution described in the present invention. The tag 100 can be made of a variety of materials, including but not limited to, Tyvek®, metal, plastic, etc. Alternatively tag 100 may be made from self-destructing materials. The tag 100 has an area reserved for an optional bar code 101. Bar coding is well known in the art, and is an efficient means for data collection. A bar code is a coded image of bars and spaces, which can be used to represent numbers and other symbols. Bar code 101 can be 1-dimension (1D), or 2-dimension (2D). Common standardized 1D bar code formats include, but are not limited to, Code 39, Code 128, and Interleaved 2 of 5. A common standardized 2D bar code format includes, but is not limited to, PDF 417. There are also various proprietary 1D and 2D bar code formats. A barcode reader is used to read the code, and translates the image of the bar code into digital data.

To provide an additional layer of security against fraud, the bar code 101 and optional human readable text 101A can deliberately be different. If someone fraudulently reproduced a bar code 101 using the human readable text 101A of the tag 100, the fraudulent bar code would not match bar code 101. This would further aid in the ability to authenticate the presence of a specific high value asset.

Bar code 101 can be printed using standard inks on a wide variety of label materials which can be adhered to tag 100.

Bar code 101 can further be prevented against fraudulent copying when it is printed on self-destructing material that comes apart if an attempt is made to peel it off tag 100.

Bar code 101 can be made more secure when it is printed with a thermochromic ink, available from companies such as, but not limited to, Standard Register. Thermochromic ink changes color or disappears when warmed and returns back to the original color upon cooling, thus making it impossible to copy using photocopiers. Thermocromic ink bar codes are also difficult to counterfeit and can be authenticated at the point of audit without the need of specialized equipment. Bar code 101 can be printed using a standard ink and a disappearing thermochromic ink in order to cause bar code 101 to morph into another image. The morphed bar code would translate into a different identification number and would alert auditors of potential fraud related to a specific high value asset. Thermochromic inks are an effective deterrent to fraud.

Another kind of bar code 101 is known as a bumpy bar code. Bumpy bar code technology uses 3-D marks, which can be placed on virtually any metal, plastic, rubber, or composite surface. These marks are expressed by highs and lows in surface height, rather than variations in black and white, as is the case with traditional bar coding. To read the mark, a bumpy bar code reader illuminates the bar code with a laser, captures the reflected image in a two-dimensional Charge-coupled Device (CCD). A Digital Signal Processor is used to analyze the angular displacement between the laser and CCD array, and allows detection of the differences in height across the bumpy bar code. The advantage of a 3-D bumpy bar code is that it can't be fraudulently photocopied.

In addition to a visible bar code 101, an invisible bar code 102 can be printed on tag 100. As an example, PhotoSecure, Inc. manufactures photoluminescent inks (SmartDYE™) and related scanners. Fluorescing inks are invisible to the naked eye and provide a moderate amount of protection against copying. By mixing SmartDYE™ components, PhotoSecure can customize each ink batch, if necessary, to have unique fluorescing characteristics. These include the specific frequency of light needed to activate them, the manner in which their fluorescence fades when the photo stimulus is removed, the exact color of the fluorescence, and other properties which can be detected and measured by their scanners. PhotoSecure's scanners are equipped with a strobe light source, a CCD image sensor, and solid-state memory for recording both the response profile of each authentic secure bar code and any encoded data the bar code may contain.

Tag 100 may also include a digital watermark 103. Digimarc Corporation's digital watermark technology embeds a special message in an image by making subtle, imperceptible changes to the original data content of an image. A digital watermark that has been fraudulently copied can be detected using a proprietary scanner.

Tag 100 may also include an embedded Global Positioning System (GPS) chip 104 to record the location of tag 100, which can be compared against a GPS receiver integrated into IWID 200 (not shown). When tag 100 and IWID 200's (not shown) individual GPS coordinates are similar this would indicate tag 100 was in the immediate presence of IWID 200 (not shown), which would indicate the authenticity of the location of a high value asset being audited.

Alternatively, the GPS circuit may be printed directly on tag 100 using technology developed by a company, such as Cypak.

Tag 100 may also include an embedded radio frequency identification (RFID) chip 105, which can communicate with the RFID interrogator chip 270, integrated in IWID 200 (not shown). RFID is well known in the art and is an automatic data capture (ADC) technology comprised of "tags", which are microprocessors, and fixed or mobile scanners known as "readers", or "interrogators". RFID chips consist of three basic types; read-only, write-only, or read-write. Interrogators read and/or write data from RFID chips via low power radio frequency (RF) signals. The data captured by an interrogator can be transferred to a host computer via wire or wireless communication links. The RFID chip 105 may be either an active or passive type. Active type RFID chip are powered by a battery, whereas passive type RFID chips are powered by RF energy generated by an interrogator. RFID systems may operate on one of several frequencies, which include, but are not limited to 125-134 kHz, 13.56 MHz, 420-450 MHz, 868-915 MHz, 2.4 GHz, and 5.8 GHz. The RFID chips 105 used in the present invention can be of an open standard type, or a proprietary standard.

As the RFID chip 105 cannot be fraudulently copied on a copier, the IWID 200 (not shown) would have to be in the immediate presence of tag 100 to indicate the authenticity of the location of a high value asset being audited. The RFID chip 105 can also be used as portable database to store and record data that is relevant to a specific high value asset.

RFID chip 105 can be used to determine position within a local positioning system. When tag 100 and IWID 200's (not shown) individual RFID-based coordinates are similar this would indicate tag 100 was in the immediate presence of IWID 200 (not shown), which would indicate the authenticity of the location of a high value asset being audited.

In addition, RFID chip 105 can be used as a component in an anti-theft system at a car lot, auto auction, etc.

Alternatively, a RFID circuit may be printed directly on tag 100 using technology developed by a company, such as Cypak. If tag 100 is printed on a self-destructing material, then any attempt to remove tag 100 from a high value asset would destroy the RFID circuitry and provide anti-fraud capability.

The information contained in an RFID chip 105 can be a numeric, alpha, or alpha-numeric code that is used to directly identify the high value asset that tag 100 is attached to. This code contained in RFID chip 105 can be used directly, or in conjunction with an audit code and an encryption algorithm to create a hash code to further insure that a high value asset is in the genuine presence of an RFID interrogator.

Figure 2B:
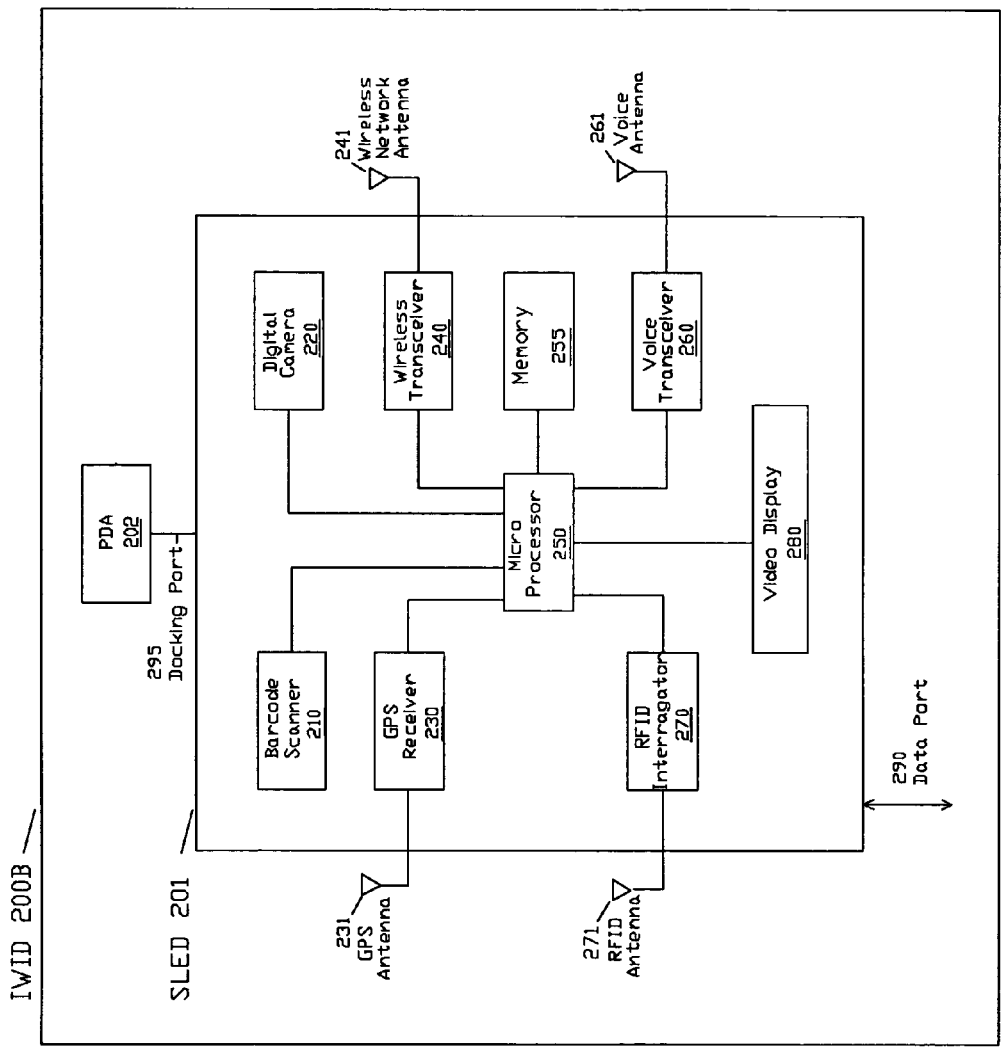
FIG. 2B is a block diagram of an integrated wireless interface device (IWID) which combines a PDA with a sled.

Hash codes are well known in the art. The use of a one-way hash code in the present invention is intended to insure the identity of a high value asset. The hash code is a check sum that is the result of a computation algorithm that uses an audit code and information contained within RFID chip 105. As the audit code changes, a different result, or one-way hash code will be generated. The audit code can be public, and will be generated by the present invention's database which may be a numeric, alpha, or alpha-numeric code. This audit code will change for every audit that is being requested and downloaded into the audit device, such as IWID 200A or 200B, as shown in FIGS. 2A and 2B respectfully. In the present invention, a hash code can be generated for each particular high value asset being audited, or for a specific group of high value assets.

In an alternate embodiment, the following is a general description of the process to initiate and complete an audit to determine the genuine presence of a high value asset using a code contained in an RFID chip 105, an audit code from the present invention's master database and an encryption algorithm contained in the audit device, such as IWID 200A or 200B as shown in FIGS. 2A and 2B respectfully.

As an example, the present invention's database will contain the names of dealers and a dynamic list of vehicles they have financed (floor planned). A program will randomly instruct the database to select the dealers to be audited at any given time. The database initiates an audit request by selecting a dealer to be audited, listing the vehicles he has financed and assigns an audit code. This audit request is then communicated via fax, e-mail, instant message, phone, pager, etc. Each dealer inputs, or downloads their unique audit code into their interrogator, which may be integrated into a device such as IWID 200A or 200B.

In order to perform the audit, the dealer will scan the tag 100 attached to each specific asset that is listed on the audit request. The code contained in RFID chip 105 will be captured using an interrogator, which may be integrated into an audit device, such as IWID 200A or 200B. If the correct encryption algorithm resides in the interrogator, or IWID 200A or 200B, a specific vehicle hash code will be generated and compared to the correct hash code for that particular vehicle and audit. If the hash codes match, IWID 200A or 200B will indicate the audit for a particular dealer has been successfully completed.

When the dealer has successfully scanned all vehicles on the self-audit request, he will download the results of the audit and other information such as but not limited to mileage, damage, etc. into a PC operatively connected to the present invention's database. Alternatively, the IWID 200A or 200B may output the hash codes for the dealer being audited, and the dealer may be required to manually transfer the generated hash code(s) via voice, fax, e-mail, or instant message to the present invention's service center personnel. Alternatively, the dealer being audited may transfer the generated hash code(s) to the present invention's database via a web-page. Once the present invention's database has analyzed the results of the audit it will output a report indicating pass, fail or invalid hash numbers.

Tag 100 may be attached to a high value asset using strap 106 and lock 107. The strap 106 and lock 107 may be made from materials such as, but not limited to, plastic, metal, etc. The lock 107 may be a releasing or non-releasing type. Strap 106 and lock 107 of the non-releasing type may be part of the GPS chip 104 and/or RFID chip 105 electrical circuit. If tag 100 has been removed from a high value asset by cutting strap 106, the GPS chip 104 and RFID chip 105 would not function, which would be an indication that tag 100 is not in the presence of IWID 200 (not shown).

Alternatively, the RFID technology discussed above can be replaced with an emerging technology known as ultra wideband (UWB) in order to achieve the communication of voice and data, and the very precise positioning functions needed in the present invention. Ultra wideband radio, also known as digital pulse wireless can transmit large amounts of digital data over a very wide spectrum of frequency bands with very low power.

Any combination or all of these technologies may be integrated into tag 100 to decrease the possibility that it may be removed from a high value asset in order to be photocopied, counterfeited or otherwise easily reproduced.

FIG. 2A is a high-level block diagram of IWID 200A contained in a housing of a single form factor which is part of the integrated solution of the present invention. IWID 200A is in essence a customized Personal Digital Assistant (PDA) which has been specifically designed for use in the present invention. The software, firmware, or hardware of a specific IWID 200A may contain a private device code that is recorded in the database 340, 340' (not shown). This private device code can be used to hash scanned data in order to turn a specific IWID 200A into a proprietary device even if it is constructed of off-the-shelf components without the need to manufacture proprietary scanning components and/or RFID chips 105 (not shown) for security and/or business reasons.

The private device code can be used to hash scanned information, in this way off-the-shelf.

The IWID 200A is comprised of the following functional items including, but not limited to, a microprocessor 250, memory 255, video display 280, and a data port 290. Optionally, it may include the following, but not limited to, a bar code scanner 210, digital camera 220, GPS receiver 230 and GPS antenna 231, a wireless transceiver 240 and wireless network antenna 241, an RFID interrogator 270 and RFID antenna 271, and a voice transceiver 260 and voice antenna 261.

Microprocessor 250 may be built on hardware including, but not limited to, Field Programmable Gate Arrays (FPGA), Application Specific Integrated Circuits (ASIC), System-On-A-Chip (SoC), etc.

The IWID 200A may contain a bar code scanner 210 which is controlled via clock driver and charge pump. Clock driver and charge pump are controlled by signals received from a timing generator. A bar code image captured by bar code scanner 210 is sent to a sampling block where the captured bar code image is correlated. After sampling, the bar code image is sent through a weak AC coupling to block DC content of the correlated sampled bar code image. After the weak AC coupling, an automatic gain control amplifies the signal which is sent to an analog-to-digital converter.

Digital data is sent to an analog-to-digital converter to the microprocessor 250. The microprocessor 250 packs the digital data so that it can be read by microprocessor 250. Microprocessor 250 is connected to memory 255, which may be embedded on microprocessor 250 which increases the speed of the IWID 200A. The microprocessor 250 operates under the control of a program stored in memory 255 via an external data and address bus. Interaction between the IWID 200A which incorporates the bar code scanner 210 may be provided using a host interface.

The bar code scanner is equipped with an illumination source which is a Light Emitting Diode (LED). Alternatively, an additional LED that operates a different wavelength may be included in order to use the previously mentioned invisible bar code technology.

The IWID 200A may also contain an REID interrogator 270 which sends out a radio frequency wave to tag 100 and in return, tag 100 broadcasts back its stored data to the interrogator 270. The data collected from tag 100 can either be sent directly to a host computer through standard interfaces, or it can be stored in a portable reader and later uploaded to the computer for data processing.

The RFID interrogator 270 receives analog signals, processes them using an analog-to-digital converter, and sends the digital signals to microprocessor 250.

The microprocessor 250 packs the digital data so that it can be read. Microprocessor 250 is connected to memory 255, which may be embedded on microprocessor 250 which increases the speed of the IWID 200A. The microprocessor 250 operates under the control of a program stored in memory 255 via an external data and address bus. Interaction between the IWID 200A which incorporates the RFID interrogator 270 may be provided using a host interface. The microprocessor 250 can use an operating system such as, but not limited to, Palm OS®, Pocket PC, Windows CE, EPOC, Linux, etc.

The IWID 200A may also be equipped with a digital camera 220, which can be used to capture an image of a high value asset, or a digital watermark 103. In addition, IWID 200 may include a GPS receiver 230, which may be used to verify the position of an IWID 200A, which can be used in conjunction with the GPS receiver in tag 100 in order to authenticate the location and identity of a high value asset by comparing locations. IWID 200A may also include a wireless transceiver, such as but not limited, to an 801.11b, or 801.11a. IWID 200A may also include a voice transceiver for connection to a network operating on standards, such as, but not limited to a CDMA, TDMA, GSM, etc. The voice transceiver can also be used to transmit data. In addition, IWID 200A may also include a Bluetooth device for connection to a piconet.

Only one data port 290 is shown for clarity, but IWIB 200A may include additional ports. These ports may include, but are not limited to an RJ-11 jack for telephone twisted pair, an RJ-45 jack for an Ethernet connection, IEEE 1394 Fire Wire connection, USB, RS-232, a PCMCIA slot. The PCMCIA slot can be used as a wireless integration point for systems such as, but not limited to, Bluetooth, 802.11a, 802.11b, ultra wideband, etc.

FIG. 2B is a high-level block diagram of IWID 200B which is a PDA and sled combination which is part of the integrated solution described in the present invention. IWID 200B is a standard Personal Digital Assistant (PDA) 202. Sled 201 is comprised of the following functional items including, but not limited to, a microprocessor 250, memory 255, digital camera 220, data port 290, and a docking port 295. Optionally, it may include, but not limited to, a bar code scanner 210, GPS receiver 230, GPS antenna 231, wireless transceiver 240, wireless network antenna 241, RFID interrogator 270, RFID antenna 271, voice transceiver 260, and voice antenna 261.

Microprocessor 250 may be built on hardware including, but not limited to, Field Programmable Gate Arrays (FPGA), Application Specific Integrated Circuits (ASIC), System-On-A-Chip (SoC), etc.

The sled 201 contains a bar code scanner 210 which is controlled via clock driver and charge pump. Clock driver and charge pump are controlled by signals received from a timing generator. A bar code image captured by bar code scanner 210 is sent to a sampling block where the captured bar code image is correlated. After sampling, the bar code image is sent through a weak AC coupling to block DC content of the correlated sampled bar code image. After the weak AC coupling, an automatic gain control amplifies the signal which is sent to an analog-to-digital converter.

Digital data is sent to an analog-to-digital converter to the microprocessor 250. The microprocessor 250 packs the digital data so that it can be read. Microprocessor 250 is connected to memory 255, which may be embedded on microprocessor 250 which increases the speed of the sled 201. The microprocessor 250 operates under the control of a program stored in memory 255 via an external data and address bus. Interaction between the IWID 200 which incorporates the bar code scanner 210 may be provided using a host interface. The microprocessor 250 can use an operating system such as, but not limited to, Palm OS®, Pocket PC, Windows CE, etc.

The bar code scanner is equipped with an illumination source which is a Light Emitting Diode (LED). Alternatively, an additional LED that operates a different wavelength may be included in order to use the previously mentioned invisible bar code technology.

The sled 201 may also contain an RFID interrogator 270 which reader sends out a radio frequency wave to tag 100. In return tag 100 broadcasts back its stored data to the interrogator 270. The data collected from tag 100 can either be sent directly to a host computer through standard interfaces, or it can be stored in a portable reader and later uploaded to the computer for data processing.

The RFID interrogator 270 receives analog signals, processes them using an analog-to-digital converter, and sends the digital signals to microprocessor 250.

The microprocessor 250 packs the digital data so that it can be read. Microprocessor 250 is connected to memory 255, which may be embedded on microprocessor 250 which increases the speed of the sled 201. The microprocessor 250 operates under the control of a program stored in memory 255 via an external data and address bus. Interaction between the sled 201 which incorporates the RFID interrogator 270 may be provided using a host interface.

The sled 201 may also be equipped with a digital camera 200, which can be used to capture an image of a high value asset, or a digital watermark 103. In addition, sled 201 may include a GPS receiver 230, which may be used to verify the position of a sled 201, which can be used in conjunction with the a GPS receiver in tag 100 in order to authenticate the location and identity of a high value asset by comparing locations. Sled 201 may also include a wireless transceiver, such as but not limited, to an 801.11b, or 801.11a. IWID 200B may also include a voice transceiver for connection to a network operating on standards, such as, but not limited to a CDMA, TDMA, GSM, etc. The voice transceiver can also be used to transmit data. In addition, sled 201 may also include a Bluetooth device for connection to a piconet.

Alternatively, some or all of the functionality of sled 201 can be replaced using Secure Digital I/O (SDIO) technology. The SDIO standard allows the SD socket to serve as a memory device and an I/O port for device expansion. This capability can give portable devices, such as PDAs, multimedia systems and cell phones additional peripheral and accessory options without increasing size or circuit complexity. SD Cards can be used to provide wireless functionality using Bluetooth, navigational devices based on GPS receivers, cameras, RFID interrogators, laser bar code readers, CCD bar code readers, and other useful devices.

Only one data port 290 is shown for clarity, but IWIB 200B may include additional ports. These ports may include, but are not limited to an RJ-11 jack for telephone twisted pair, an RJ-45 jack for an Ethernet connection, IEEE 1394 Fire Wire connection, USB, RS-232, a PCMCIA slot. The PCMCIA slot can be used as a wireless integration point for systems such as, but not limited to, Bluetooth, 802.11a, 802.11b, ultra wideband, etc.

Figure 3:
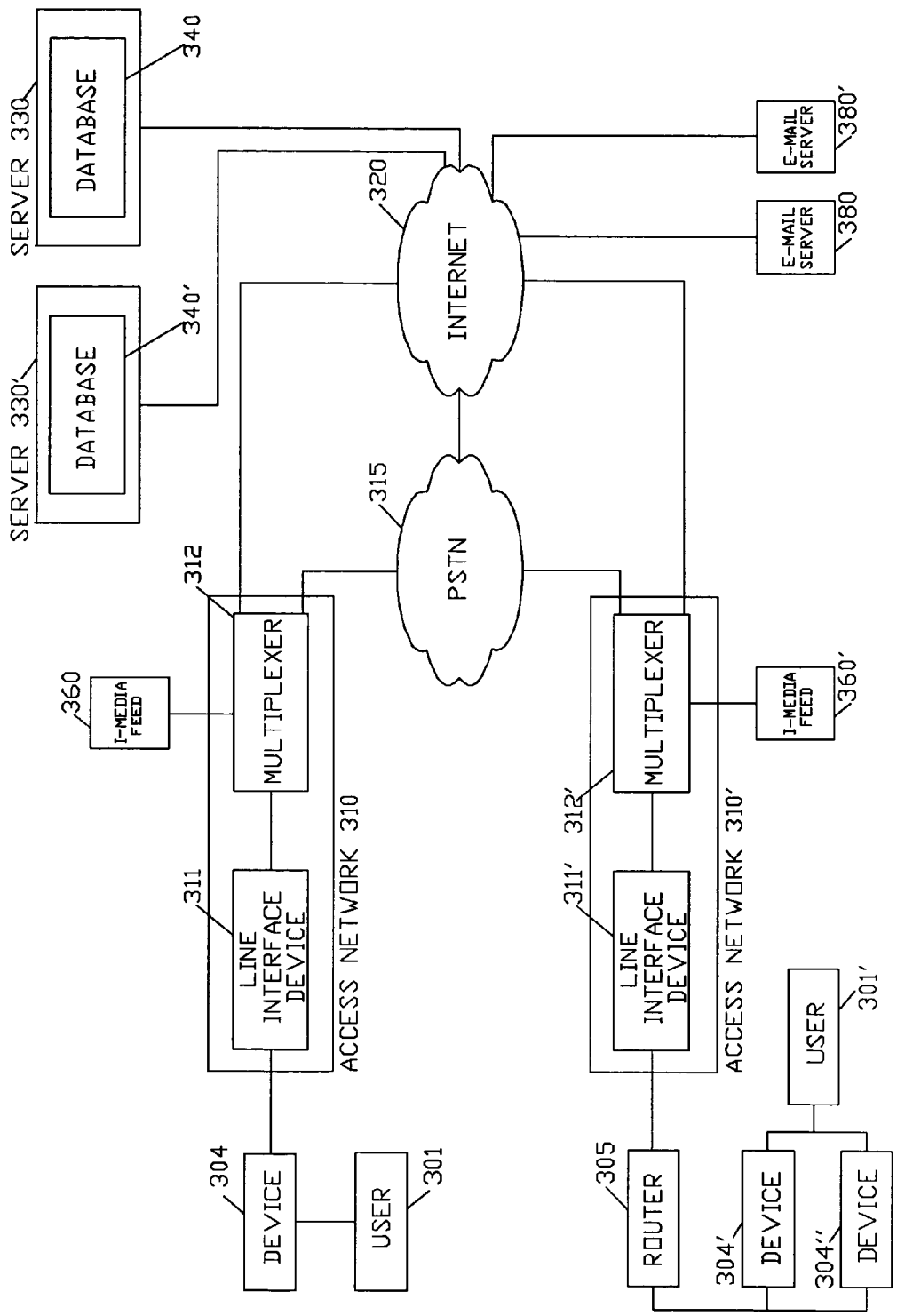
FIG. 3 is an illustration of the general topography of the present invention.

Optionally, the IWID 200B may be connected to a magnetic stripe reader which can be used to read information contained on a particular dealer's "Gold Card" issued by an auto auction in order to quickly and accurately create, update, and annotate records in database 340' as described in FIG. 3.

Alternatively, the IWID 200B may be constructed of stand-alone components, which include a PDA with or without an integrated digital camera, and with or without integrated wireless communications capabilities. The stand-alone PDA may be connected to a stand-alone bar code reader and/or RFID interrogator.

IWID 200A or IWID 200B described above may also include voice recognition software in order to receive verbal inputs as a means of interface.

FIG. 3 illustrates the general topography of the preferred embodiment of the present invention. The present invention provides servers 330, 330' which contain databases 340 and 340' respectively. Database 340' is used to store information needed for authentication of the genuine presence of a high value asset, and demographic information related to any company that has an interest in a high value asset. This demographic information stored on Database 340' can be used to drive a messaging system for use at an auction. Database 340 contains detailed information related to a specific high value asset, and demographic information related to a dealer that has control of a specific high value asset.

Databases 340, 340' are accessible via the Internet 320. Servers 330, 330' can be a collection of one or more servers, computers, etc. that are able to provide functionality for the present invention. Server 330, 330' can include multiple similar and distinct hardware components or models, such as but not limited to Dell, IBM, Sun, HP and required operating system software such as but not limited to UNIX, Microsoft Windows, Redhat Linux and other required supportive operating systems. In addition, servers 330, 330' can include a multitude of supporting software components required to support the implementation of the present invention including, but not limited to Apache Web Server software, Microsoft IIS Web Server Software, Oracle, MySQL, Lightweight Directory Access Protocol (LDAP), Domain Name System (DNS) and HyperText Transfer Protocol (HTTP), Voice recognition software, Voice application engines, Application engines, and CORBA software and middleware. Databases 340, 340' represents the storage of data including software required to run servers 330, 330' and provide functionality for the present invention. Databases 340, 340' can be attached to server 330, 330' via network transport or bus connections including, but not limited to Small Computer Systems Interface (SCSI), Internet SCSI (iSCSI), Peripheral Component Interconnect (PCI), Fiber optic transport, Fiber Channel, TCP/IP, and SNA. In addition, databases 340, 340' can be a collection of one or more media storage units that are located locally or remotely to servers 330, 330'. Databases 340, 340' can be built on storage such as, but not limited to, magnetic and optical media. These systems and associated software may be housed in an Internet Data Center equipped with fully redundant subsystems, such as multiple fiber trunks coming from multiple sources, redundant power supplies, and backup power generators. Databases 340, 340' may also utilize firewall technology to securely protect the information stored in databases 340, 340'. In addition, database 340, 340' may provide secure access through the use of passwords, Personal Identification Numbers (PIN), and/or biometric identification. Such systems are commonly used in applications such as those described in the preferred embodiment of the present invention.

The tables in database 340', shown in Charts 1, 2, 3, and 4 relating to the preferred embodiment of the present invention, can include information, such as, but not limited to, that related to the authentication of a high value asset, and contact information needed to message an individual, dealer at an auction, or company that maintains an interest in a particular high value asset. Database 340' can be used as a clearinghouse for insurance companies to verify who has care, custody, and control of a particular high value asset. When an insurance company posts a policy number related to a particular high value asset this can be used a flag to cause an audit. Database 340' can be owned or operated by an auction, such as Manheim, an automotive information company such as Carfax, Kelley Bluebook, VINtek, or a third-party Application Service Provider, etc.

CHART 1

HIGH VALUE ASSET AUTHENTICATION MASTER TABLE

Tag ID no.
Human readable text associated with bar code
RFID MAC address

CHART 1-continued

HIGH VALUE ASSET AUTHENTICATION MASTER TABLE

GPS MAC address
Digital watermark file pointer
Data contained in invisible bar code
Data contained if bar code is morphed
VIN
Finance company name
Dealer name Tag ID No. and/or bar coded information can be input into table represented in Chart 1 via a device such as, but not limited to, IWID 200A, 200B, laptops, tablets, PCs, telephones, etc. The relationship between a particular high value asset, dealer, and identification tag 100 (not shown) could easily be established at the gate of an auto auction by scanning the VIN, affixing and scanning tag 100, and polling a dealer's IWID 200A, 200B (not shown).

CHART 2

FINANCE/LEASE/RENTAL/INSURANCE COMPANY DEMOGRAPHIC TABLE

Finance/rental/lease/insurance company name
Finance/rental/lease/insurance company address
Finance/rental/lease/insurance company telephone no.
Finance/rental/lease/insurance company e-mail address
Finance/rental/lease/insurance company transaction ID no.

Tables 3 and 4 in database 340 can include information such as, but not limited to, that related to dealer demographics, and high value asset features and options. The information contained in database 340 may be contained in any or all of the following: an auction, such as Manheim, an automobile manufacturer, such as Ford, General Motors, Toyota, etc., an automotive information company such as Carfax, Kelly Bluebook, VINtech, or a third-party Application Service Provider, etc.

CHART 3

DEALER DEMOGRAPHIC TABLE

Dealer name
Dealer address
Dealer telephone No.
Dealer e-mail address
Dealer employee name(s)
Dealer employee e-mail address(es)
Dealer employee cell phone number(s)
Dealer employee IWID MAC address
Customer name(s)

CHART 4

HIGH VALUE ASSET FEATURES AND OPTIONS TABLE

VIN
New/Used
Year
Make
Model
No. of doors
Exterior color
Interior color
Engine size
Gas or diesel

CHART 4-continued

HIGH VALUE ASSET FEATURES AND OPTIONS TABLE

Turbocharged
Supercharged
Transmission
2WD
4WD
Odometer Reading
Warranty
Equipment
    Power steering
    Power brakes
    Power disc brakes
    Anti-lock brakes
    Rear window defroster
    Power windows
    Power seats
    Door locks
    Bucket seats
    Split seats w/armrest
    Bench seats
    Folding rear seat
    Air conditioning
    Speed control
    Traction control
    Air bags
    Gauges
    Alloy wheels
    Power antenna
    Tilt steering wheel
    Towing package
    Automatic lighting
    Sun roof
    Information system (temp., compass, etc.)
    Trip computer
    Interior (fabric/leather/vinyl)
    AM/FM stereo
    Premium sound system
    Tape player
    CD player
    DVD player
    TV
    Audio/video jacks
    Security system
    Keyless entry
    Navigation system
    Heated seats
    Seat memory
    Heated mirrors
    Remote starter
    Vanity lights
    Adjustable pedals
    12 volt jacks
    Luggage rack
    Garage door opener
    Alarm system
Invoice price
Sticker price FIG. 3 represents the preferred embodiment of the present invention, in which two users 301, 301' are connected via access networks 310, 310'.

Access Networks 310, 310' may be configured as Cable TV or PSTN, and can be used for accessing information stored in databases 340, 340', and for messaging users 301, 301' and/or devices 304, 304', 304" which are connected to one of these types of networks. Devices 304, 304', 304" may be devices such as, but not limited to, IWID 200A, 200B (not shown), PCs, TVs, set-tops boxes, Internet appliances, e-mail stations, telephones, kiosks, ATMs, etc. Devices 304', 304" are shown connected to a router 305 which is connected to Access Network 310'. As an example, router 305 can be of the type included in a Linksys "EtherFast 10/100 Network in a Box", product number FENSK05.

At a minimum, access networks 310, 310' are typically configured with a multiplexer 312, 312' and line interface device 311, 311'. The line interface device 311, 311' may be configured as a stand-alone modem or codec, within a PCM-CIA card, as a wireless POP, or integrated into devices 304, 304', 304" such as, but not limited to, IWID 200A, 200B (not shown) TVs, PCs, PDAs, tablets, telephones, set-top boxes, etc.

The multiplexer 312, 312' may be located at the Central Office, or Digital Loop Carrier of a telephony network, or the Head-End, or intermediate node of a Cable TV network, or at a third-party Application Server Provider's office, or the network center of an auction house, etc. The multiplexer 312, 312' is capable of receiving analog and digital signals including, but not limited to interactive media (I-Media) feed 360, 360', Internet traffic 320 including e-mail from e-mail servers 380, 380' and data from servers 340, 340', and voice feed from the PSTN 315, and data from servers 340, 340', etc. The I-Media feed 360, 360' may be a service such as, but not limited to, an auto auction. I-Media feed 360, 360' may originate sources such as, but not limited to, video servers, satellite feeds, etc. The multiplexed signal from multiplexer 312, 312' may be transmitted over a variety of transmission medium, including but not limited to, coaxial cable, fiber optic cable, twisted pair, plastic fiber cable, airwaves, or a combination of these.

Databases 340, 340' can be accessed by a specific user 301, 301' through the Internet 320 to add, modify, and delete unique identifiers, demographic information, high value asset information, etc.

The preferred embodiment of the present invention as shown in FIG. 3 illustrates server 330, 330' residing on the Internet. Optionally, it may reside on a Virtual Private Network (VPN), a wide-area network (WAN), or local area network (LAN). The server 330, 330' has all of the necessary hardware and software required to store a user's 301, 301' demographic data, as well as control the access to the user's 301, 301' data from any computer equipped with an Internet browser, such as, but not limited to Microsoft Internet Explorer, etc.

Figure 4:
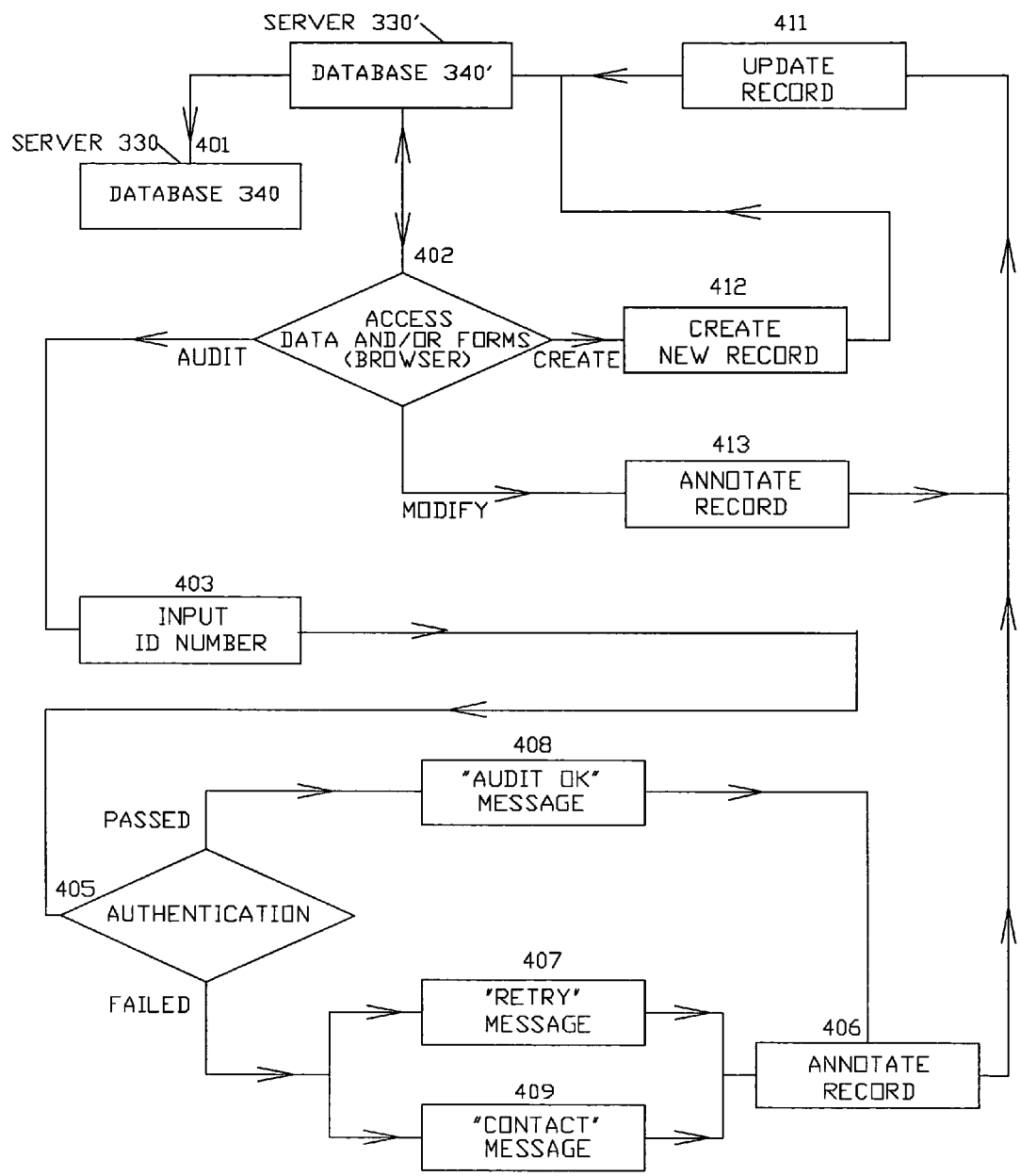
FIG. 4 is a flow chart that illustrates the steps involved in using the present invention for authentication and audit purposes.

FIG. 4 is a flow chart that illustrates the steps involved using the preferred embodiment of the present invention for authentication and audit purposes using a web-page interface with database 340'.

Initially, a user of the present invention accesses a third party network server 330' to which the user, such as a dealer, auction house, finance company, insurance company is a subscriber. Access to database 340' stored on server 330' is obtained through a browser 402 which displays a webpage (not shown) on the subscriber's remote computer, laptop, IWID 200A, 200B (not shown), etc. On the webpage being displayed in browser 402, a subscriber is requested to enter an access code and user identification to access and view records and other information related to a specific high value asset. Each subscriber would have their own individual access code and user identification which would allow each subscriber to independently provide, edit, review, and download records and information related to a specific high value asset. Should any questions arise, subscribers would be able to click on the e-mail address provided to ask the third party provider of the database any questions. Alternatively, a subscriber could call the third party provider of the database with any questions. The webpage and the forms associated with the present invention's database can be created using web development software using Hyper Text Markup Language (HTML), Active Server Pages (ASP) or JavaScript, etc., build using development tools such as, but not limited to, Microsoft FrontPage, Microsoft Interdev, and database software, such as, but not limited, Corel Paradox, Oracle, Microsoft Access or Microsoft SQL Server. The various forms associated with the database 340' allow the subscriber to create new records, annotate existing records, make hyperlinks, upload and download images, and access information required to authenticate and audit a remote high value asset, such as a car or truck.

The user self-auditing a vehicle will be directed to an audit webpage, where they will be directed to input the identification number associated with a specific high value asset. A user will use IWID 200A, 200B as described in FIGS. 2A and 2B, or a stand-alone device to scan a bar code and/or RFID chip on tag 100 in order to retrieve identification information. This identification number may be one that already exists on the high value asset, or may be an identification number associated with the tag 100 as shown in FIG. 1. The identification number may be input using a computer telephone interface with a telephone keypad, scanned from a bar code or an RFID tag, voice recognition, or input manually into a PDA, IWID 200A, 200B (not shown), laptop, PC, Internet appliance, etc. If the authentication is within prescribed tolerances, the user will receive an "Audit OK" or similar message 408, and the specific high value asset's record will be annotated in step 406, and database 340's records will be updated in step 411.

If the identification numbers do not match, and/or authentication devices, such as an invisible bar code, digital watermark, location provided by GPS, etc. don't fall within prescribed tolerances, the user will get either a "Retry" message 407, or "Contact" message 409. The specific high value asset's record will be annotated in step 406, and database 340's records will be updated in step 411.

The webpage on browser 402 will also provide a user the ability to choose to modify an existing record, which is annotated in step 413, or to create a new record for a specific high value asset which is done in step 412.

Alternatively, the flow described above may be carried out in a less automated manner. The third party provider of the database may also provide a call center staffed with personnel that will serve as the interface with the database. The third party call center personnel may contact the dealer to request they perform a self-audit via telephone, and fax, e-mail, or instant message them the list of vehicles to be self-audited.

The inventors have designed and built a demonstration of the self-audit functionality of the present invention. This prototype used a PDA with an attached RFID interrogator in the form of a SDIO card. Model cars with RFID tags attached were scanned with the PDA. The prototype also employed an audit code and hash code to authenticate the genuine presence of a high value asset.

Figure 5:
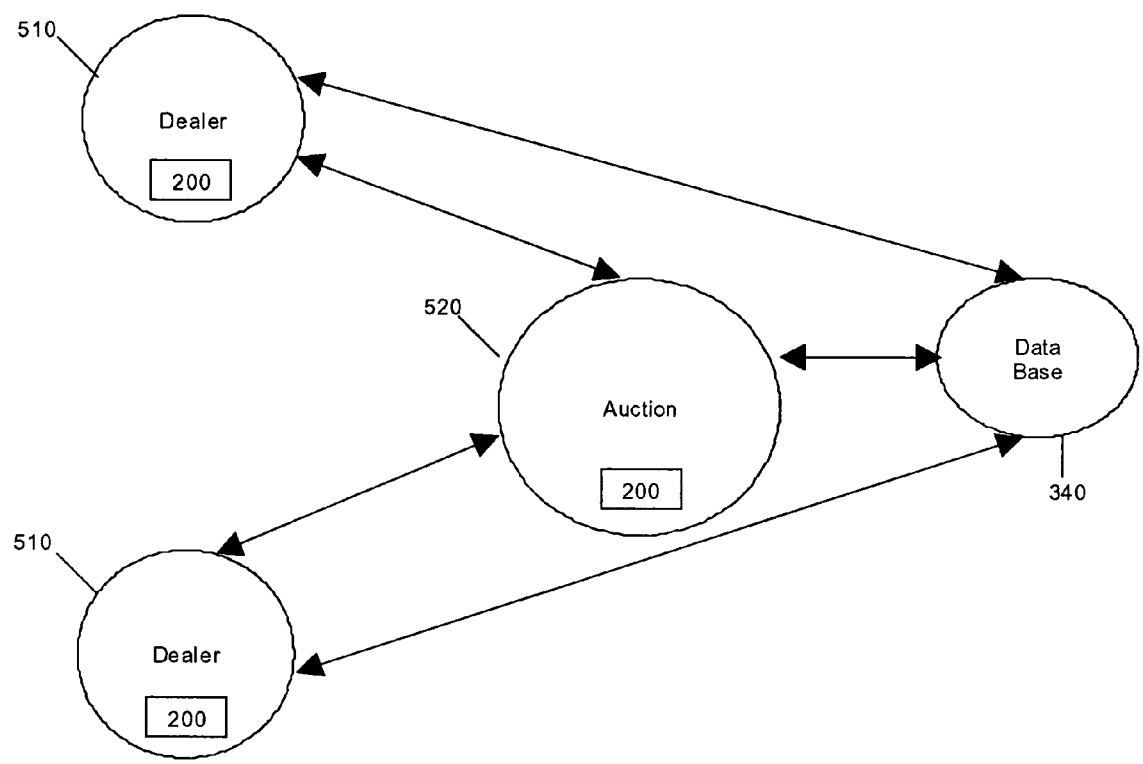
FIG. 5 is an illustration of the general topography of the present invention for use in the automobile industry.

FIG. 5 is an illustration of the general topography of the present invention for use in the automobile industry. Dealer 510, auction 520, and the present invention's database 340 are interconnected with a telephony network. This telephony network may include the Internet, the public switched telephone network (PSTN), and/or a wide area network (WAN), and/or metropolitan area network (MAN), and/or a local area network (LAN), and/or a wireless local area network (WLAN), etc.

IWID 200A or IWID 200B as described in FIGS. 2A and 2B respectively, can be used at both a dealer 510, and also at an auction 520. At the dealer 510 the IWID 200 can be used to perform a self-audit when requested by the present invention's database 340. In addition, at the dealer 510 the IWID 200 can be used to for related activities such as, but not limited to inventory control, repair work orders, targeted advertising, customer loyalty programs, Customer Relationship Management (CRM), sales force automation, distribution control, field force automation, logistics management, document control, voice and/or text communications, etc.

IWID 200A or IWID 200B can also be used at an auto auction to enable a dealer in the auction process. IWID 200A or 200B can be used to physically locate vehicles of interest on the auction lot using radio frequency positioning technologies based on GPS and/or RFID. IWID 200A or 200B can also be used, tap into a wireless network in order to find out specific information on a vehicle, keep track of a vehicle as it progresses through an auction, participate in the bidding process, send and receive e-mails or instant messages, and make phone calls.

The auction 520 can derive many of the same benefits that a dealer 510 can from the use of an IWID 200A or 200B, including locating vehicles, entering work orders, voice and/or text communications, etc.

Figure 6:
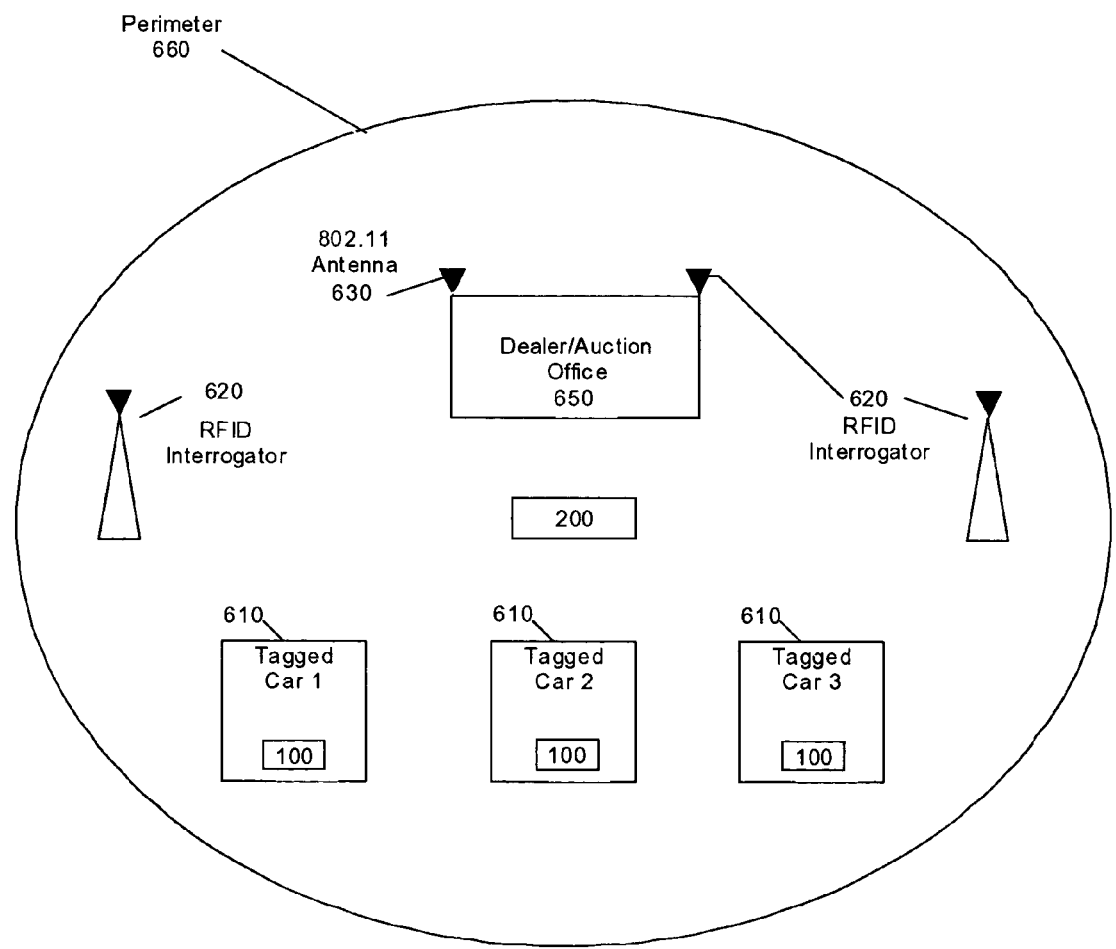
FIG. 6 is an illustration of the various components of the present invention for use in the automobile industry.

FIG. 6 is an illustration of the various components of the present invention for use in the automobile industry. The perimeter 660 of a dealer or auction refers to the wireless operational perimeter, not the actual property line associated with either a dealer or auction office 650. In order to enable the desired functionality of the present invention, IWID 200A or 200B as described in FIGS. 2A and 2B respectively, may communicate with a host computer via a WLAN. An 802.11 antenna is shown, which may be 802.11a or 802.11b. The host computer (not shown) may be owned by the dealer or auction, and/or the host computer may be owned by a third-party.

In addition, IWID 200A or IWID 200B, which may include an RFID interrogator may be used to perform a manual self-audit of a vehicle 610 that has been tagged with tag 100 as described in FIG. 1 when requested by the present invention's database 340 (not shown).

RFID interrogators 620 can be used to detect the presence of tagged cars 610 within the operational perimeter 660 of the present invention. These RFID interrogators 620 can be used to perform automated audits of the tagged cars 610 at either a dealer or auction.

In addition, when three or more RFID interrogators 620 are available in a geographic relationship that overlaps the tagged cars 610 can be used to determine the position of a tagged car via radio position time-of-arrival triangulation, which is well-known in the art.

A general description of the present invention, as well as a preferred embodiment, and alternative aspects of the present invention has been set forth above. Those skilled in the art to which the present invention pertains will recognize and be able to practice additional variations in the methods, systems, and applications other than automotive, such as recreational vehicle, boat, motorcycle, construction equipment, farm equipment, manufacturing equipment, containerized freight, art, antiques, collectables, etc. described, which fall within the teachings of this invention. The present invention further provides for variations in the manner in which such assets are identified and authenticated. Accordingly, all such modifications and additions are deemed to be within the scope of the invention.

What is claimed is:

1. A method for verifying compliance with a finance agreement between a first party and a second party, the finance agreement associated with an asset, the method comprising:

affixing a self-destructing identification tag to the asset associated with the finance agreement, wherein the first party provides asset financing and the second party is permitted to sell the asset associated with the finance agreement;

notifying the second party to perform a self-audit of the asset, wherein the notifying is performed by fax, e-mail, instant message, phone, or pager;

the second party reading said self-destructing identification tag using a machine configured to read encrypted data from said self-destructing identification tag;

generating audit information, the audit information being at least partially based on the encrypted data;

the second party sending audit information based on the encrypted data to the first party, wherein the sending is performed by voice, fax, e-mail, or instant message;

analyzing the audit information to determine whether the second party is complying or not complying with the finance agreement based on the audit information; and wherein the step of analyzing the audit information is performed by a server programmed to analyze the audit information and determine whether the second party is complying or not complying with the finance agreement based on the audit information.

2. The method of claim 1 wherein the asset associated with the finance agreement is selected from a set consisting of a car, a truck, a recreational vehicle, a boat, a motorcycle, construction equipment, farm equipment, manufacturing equipment, containerized freight, art, an antique, and a collectible.

3. The method of claim 1 wherein the self-destructing identification tag includes a radio frequency identification tag.

4. The method of claim 1 wherein the self-destructing identification tag includes a bar code.

5. The method of claim 1 wherein the audit information comprises a hash.

6. The method of claim 1 wherein the self-destructing identification tag includes a bar code tag.

7. The method of claim 1 wherein the machine that is configured to read encrypted data from said self-destructing identification tag is integrated in a cell phone.

8. The method of claim 1 wherein the encrypted data includes an audit code.

9. The method of claim 1 wherein the encrypted data includes a geographic position associated with the asset.

* * * * *